US012782873B2

(12) United States Patent
Chaveriat et al.

(10) Patent No.: US 12,782,873 B2
(45) Date of Patent: Nov. 3, 2026

(54) MOON PHASE DISPLAY MECHANISM FOR WATCH MOVEMENT

(71) Applicant: LA MONTRE HERMÈS S.A., Brügg (CH)

(72) Inventors: Bertrand Chaveriat, Le Russey (FR); Jean-François Mojon, Les Hauts-Geneveys (CH); Xavier Clement, Fournets Luisans (FR)

(73) Assignee: LA MONTRE HERMÈS S.A., Brügg (CH)

(*) Notice: Subject to any disclaimer, the term of this patent is extended or adjusted under 35 U.S.C. 154(b) by 191 days.

(21) Appl. No.: 18/863,267

(22) PCT Filed: May 10, 2023

(86) PCT No.: PCT/EP2023/062362
§ 371 (c)(1),
(2) Date: Nov. 5, 2024

(87) PCT Pub. No.: WO2023/217830
PCT Pub. Date: Nov. 16, 2023

(65) Prior Publication Data

US 2025/0315011 A1 Oct. 9, 2025

(30) Foreign Application Priority Data

May 12, 2022 (CH) ................................ 000569/2022

(51) Int. Cl.
*G04B 19/26* (2006.01)

(52) U.S. Cl.
CPC .................................. *G04B 19/268* (2013.01)

(58) Field of Classification Search
CPC ..... G04B 19/26; G04B 19/268; G04B 19/262
See application file for complete search history.

(56) References Cited

U.S. PATENT DOCUMENTS 1,113,772 A * 10/1914 Garlitz ............... B65G 21/2018 198/791
4,684,260 A * 8/1987 Jackle .................. G04B 19/268 968/210

(Continued)

FOREIGN PATENT DOCUMENTS

CH 710450 B1 6/2018
CN 202548538 U 11/2012

(Continued)

OTHER PUBLICATIONS

International Search Report and Written Opinion of the ISA for PCT/EP2023/062362, mailed Aug. 22, 2023, 11 pages.

*Primary Examiner* — Sean Kayes
(74) *Attorney, Agent, or Firm* — NIXON & VANDERHYE

(57) ABSTRACT

A Moon phase display mechanism comprises a Moon, a mask, and a drive device arranged in such a way that the mask and the Moon move, during each lunar cycle, in the following sequence:

a) with the Moon and the mask both located in an initial position, in a new Moon configuration, the Moon is driven to progressively disengage from the mask, until it is positioned in a final position in the middle of a given lunar cycle, in a full Moon configuration, b) the mask is driven to cover the Moon, until it is positioned in the final position at the end of the given lunar cycle, in a new Moon configuration, and c) the Moon and the mask are driven to rapidly return to their initial positions, in a new Moon configuration.

32 Claims, 5 Drawing Sheets

(56) References Cited

U.S. PATENT DOCUMENTS

| | | | | |
|---|---|---|---|---|
| 6,507,536 | B1 * | 1/2003 | Keatch | G04B 19/268 434/284 |
| 6,928,032 | B2 * | 8/2005 | Plange | G04B 19/26 434/284 |
| 7,649,811 | B2 * | 1/2010 | Courvoisier | G04B 19/268 368/18 |

FOREIGN PATENT DOCUMENTS

| | | | |
|---|---|---|---|
| EP | 1692574 | B1 | 7/2009 |
| EP | 3477402 | A2 | 5/2019 |
| EP | 3477402 | A3 | 5/2019 |
| EP | 3985449 | A1 | 4/2022 |

* cited by examiner

MOON PHASE DISPLAY MECHANISM FOR WATCH MOVEMENT

CROSS-REFERENCE TO RELATED APPLICATIONS

This application is the U.S. national phase of International Application No. PCT/EP2023/062362 filed May 10, 2023 which designated the U.S. and claims priority to CH 000569/2022 filed May 12, 2022, the entire contents of each of which are hereby incorporated by reference.

TECHNICAL FIELD

The present invention relates to a display mechanism, for a watch movement, comprising

- a disc-shaped representation of the Moon,
- a mask suitable for masking the representation of the Moon,
- a drive device for the mask arranged to be able to move it along a predefined trajectory extending from an initial position to a final position, so that the representation of the Moon and the mask can present, along the trajectory, a full Moon configuration in which the representation of the Moon is completely visible, and a new Moon configuration in which the representation of the Moon is completely masked.

The present invention also relates to a watch movement comprising such a display mechanism, and to a timepiece comprising such a watch movement.

STATE OF THE ART

Such display devices have already been disclosed in the prior art.

By way of example, utility model CN202548538U presents a moon phase display mechanism including the above characteristics. In particular, the display mechanism disclosed therein comprises a fixed representation of the Moon, carried by the dial of the corresponding timepiece, in front of which moves a mask carried by an arm driven so as to present a periodic retrograde displacement. More precisely, the mask is driven to exhibit the following displacements during each period, the duration of which is equal to that of a lunar cycle: starting from a first full Moon configuration, the mask is driven in an anti-clockwise direction of rotation from an initial position, to progressively cover the representation of the Moon, up to a new Moon configuration, the drive still continuing up to a final position in which the representation of the Moon is once again entirely clear, in a new full Moon configuration. The mask is then rotated rapidly clockwise (i.e., retrograde with reference to the slow counter-clockwise drive phase) and returned to its initial position, still in a full Moon configuration, before starting a new cycle.

Patent EP1692574B1 describes another Moon phase display mechanism with the features mentioned above. More specifically, this mechanism comprises a representation of the Moon carried by a first arm and a mask carried by a second arm. The arms are driven to make a first slow movement in respective opposite directions from a first full Moon configuration to a second full Moon configuration, progressively passing through waning Moon phases, a new Moon configuration and then waxing Moon phases. Once the second full Moon configuration is reached, the Moon representation and the mask are rapidly moved, in a retrograde manner, to return to the first full Moon configuration after a duration equal to one lunar cycle, before starting a new cycle. Thus, compared with that described above, this mechanism reduces the footprint of the Moon phase display, since the angular sector covered by the mask is reduced by the fact that the Moon representation is also driven in the opposite direction to that of the mask.

The main aim of these display mechanisms is to reduce the size of the Moon phase display on a timepiece dial, while providing a relatively realistic display of the Moon phases as they appear to an observer in reality, without however taking into account the Moon's displacement in the sky throughout a given lunar cycle.

Patent CH710450B1 describes a further construction of a Moon phase display mechanism aimed at improving realism, by providing an orbital display of the Moon to symbolize the relative rotation between the Earth's surface and the Moon. To this end, the display mechanism comprises a disc, constituting the dial of the corresponding timepiece, comprising an aperture, through which a representation of the Moon is visible, and driven to rotate on itself in twenty-four hours. The mechanism further comprises a mask driven around the dial in twenty-four hours with virtually no change in its orientation, and simultaneously driven to move opposite the aperture to display the phases of the Moon in periods of equal duration to that of the lunar cycle. While this mechanism is more realistic than its predecessors, since the Moon's representation moves along a complete circular trajectory, its legibility is equivalent to that of the previous mechanisms, due to the reduced size of the Moon's representation. In addition, the gain in realism means that the display mechanism takes up considerably more space, since the entire dial is driven in rotation, since it is intended to display the starry sky, making it impossible to envisage the addition of further complications.

Consequently, there is still a need for an alternative Moon phase display mechanism that is realistic, legible, dynamic and compact enough to allow the addition of further complications.

DISCLOSURE OF THE INVENTION

A principal aim of the present invention is to propose a display mechanism of alternative construction to known display devices, in order to produce a timepiece that is at the same time original in appearance, realistic, and highly legible.

To this end, the present invention relates more particularly to a display mechanism of the type mentioned above, characterized

- by the fact that it comprises a Moon display member carrying the representation of the Moon, as well as a drive device for the Moon display member arranged to be able to move the latter along the predefined trajectory, between the initial and final positions, and
- by the fact that it is arranged in such a way that the mask and the representation of the Moon move, during each lunar cycle, according to the following sequence:

a) with the representation of the Moon and the mask both located in the initial position, in a new Moon configuration, the representation of the Moon is driven along the predefined trajectory, to progressively disengage from the mask, until it is positioned in the final position in the middle of a given lunar cycle, in a full Moon configuration, b) the mask is driven along the predefined trajectory, to progressively cover the representation of the Moon, until it is positioned in the final position at the end of the given lunar cycle, in a new Moon configuration, and c) the representation of the Moon and the mask are driven so as to both rapidly return to the initial position, in a new Moon configuration, to begin a new sequence.

Thanks to these features, the display mechanism according to the present invention presents an operating sequence different from that of the previous display mechanisms, while maintaining an optimized footprint level, since the extent of the trajectory covered by the representation of the Moon and the mask can be contained within a sector joining their centers when they are positioned adjacent to each other in a front view.

According to a preferred embodiment, the Moon display is a rotating dial, the mask being carried by a frame capable of also carrying a surface for displaying information other than the phases of the Moon and arranged so as to mask a portion of the rotating dial other than the representation of the Moon. It is therefore advantageous to provide that the representation of the Moon has a diameter representing at least 50%, preferably at least 60%, of the radius of the rotating dial.

Generally speaking, it is preferable to provide that the representation of the Moon and the mask are driven in a retrograde manner during step c), with reference to their direction of movement during steps a) and b).

Preferably, the representation of the Moon and the mask can be driven substantially simultaneously in step c).

Advantageously, it can be provided that the drive device for the Moon display member comprises a feeler held in abutment against a guide surface of a cam, to define the angular orientation of the feeler at each instant, under the effect of the action of an elastic return member, and that the feeler is integral with a toothing arranged in engagement with a Moon drive mobile whose angular orientation determines that of the Moon display member.

In this case, the guide surface can also have a first portion of increasing radius, followed by a second portion of substantially constant radius and a third, empty or radial, portion connecting the first and second portions.

It is thus further possible to provide that the mask drive device comprises an additional feeler held in abutment against a guide surface of an additional cam, to define the angular orientation of the additional feeler at each instant, under the effect of the action of an elastic return member, and that the additional feeler is integral with a toothing arranged in engagement with a driving mobile of the mask drive whose angular orientation determines that of the mask.

In this case, it can also be envisaged that the guide surface of the additional cam has a first portion of substantially constant radius, followed by a second portion of increasing radius and a third portion, empty or radial, connecting the first and second portions.

It may then be particularly advantageous to provide that the display mechanism comprises a kinematic connection between the cam and the additional cam, and that the first and second portions of the cam guide surface and the first and second portions of the additional cam guide surface all have substantially equal angular extents.

Furthermore, in this case, it is preferable to provide that the mechanism comprises a bearing surface integral with one of the feeler and the additional feeler and capable of bearing against a stop surface integral with the other feeler, and that the feeler and additional feeler are arranged in such a way that the passage of the feeler associated with the bearing surface from the second portion to the first portion of the corresponding guide surface is conditioned by the passage of the feeler associated with the stop surface from the second portion to the first portion of the corresponding guide surface, in order to synchronize the movements of the representation of the Moon and the mask during step c).

In a preferred embodiment, the display mechanism may be provided with a latitude adjustment device arranged to modify the angular orientations of the Moon display member and the mask in a coordinated manner in response to a predefined action of a user on a latitude adjustment member.

In this case, it is advantageous to provide that the display mechanism additionally comprises a latitude display member to display the set latitude at each instant, the latitude adjustment device also being arranged to control the position of the latitude display member.

Generally speaking, it is preferable to provide that the predefined trajectory travelled by the representation of the Moon and by the mask is circular.

The present invention also relates to a watch movement comprising a display mechanism including the characteristics set out above, as well as to a timepiece comprising such a watch movement.

BRIEF DESCRIPTION OF THE DRAWINGS

Further features and advantages of the present invention will become clearer on reading the following detailed description of a preferred embodiment, made with reference to the appended drawings given by way of non-limiting example and in which.

EMBODIMENT(S) OF THE INVENTION

Figure 1:
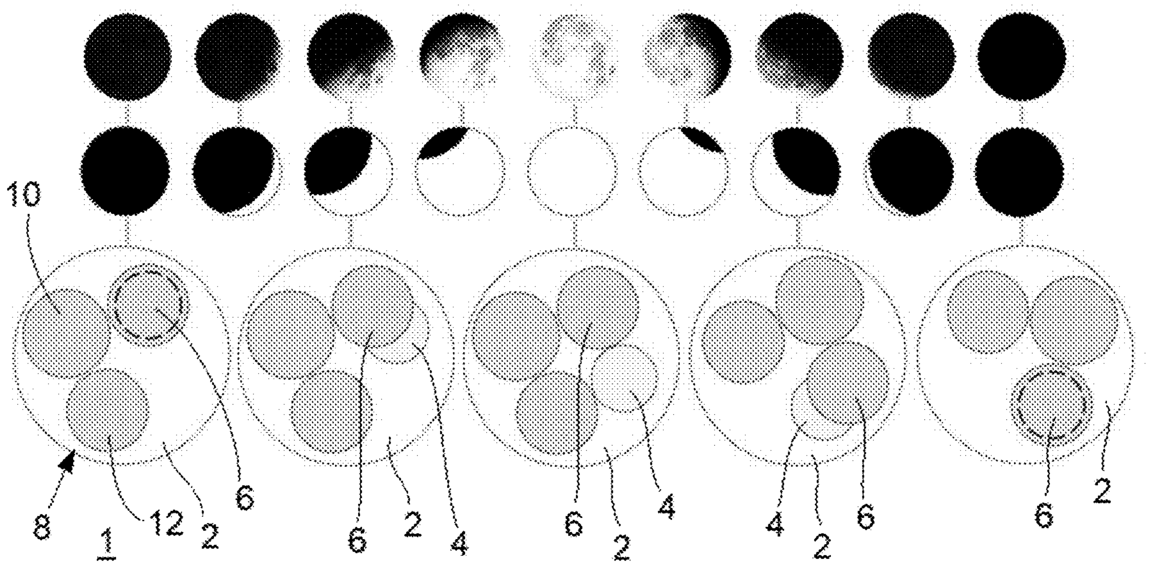
FIG. 1 represents a schematic diagram illustrating the general operating principle of a display mechanism according to a preferred embodiment of the present invention.

FIG. 1 shows a schematic diagram illustrating the general operating principle of a display mechanism according to a preferred embodiment of the present invention. Of course, FIG. 1 and its following detailed description are provided by way of illustrative example, and the person skilled in the art will be able to make adaptations justified by his own needs without necessarily departing from the scope of the invention as defined by the claims.

The diagram in FIG. 1 comprises three lines arranged one above the other.

The top line represents the appearance of the Moon as it appears in the sky when it is located at its zenith (its orientation changing continuously and perceptibly due to the Earth's rotation on itself), at a latitude of around 45 degrees, on the first day of a new lunar cycle starting with a new Moon, then on day 4, day 7, day 11, day 15 (full Moon), day 19, day 22, day 25, then day 29 (next new Moon).

The next line (middle) represents schematic representations of the Moon's phases at the same moments all along the lunar cycle, always while at its zenith.

The bottom line represents, in a simplified and schematic manner, the implementation of a Moon phase display mechanism 1, according to a preferred embodiment of the invention, enabling Moon phases to be displayed reliably and realistically with reference to what can be observed in the sky when the Moon is located at its zenith. For reasons of simplification and legibility, the configuration of the display mechanism has not been shown for all the days of the lunar cycle illustrated in the first two lines, but only for day 1, day 7, day 15, day 22 and day 29.

The display mechanism 1 comprises a Moon display member 2 bearing a representation of the Moon 4 and which here takes the form of a rotating dial, by way of non-limiting illustration.

A mask 6 is arranged above the rotating dial (from the point of view of an observer of the corresponding timepiece), so as to be able to at least partially cover the representation of the Moon 4 in certain configurations. Here, the mask 6 is carried by a frame (numerical reference 8 in FIG. 4) driven in rotation in a suitable manner to enable the phases of the Moon to be displayed at any given moment. As a non-limiting example, the mask 6 takes the form of a disk whose diameter is equal to, or even slightly greater than, that of the representation of the Moon 4. Two additional disks 10 and 12, also carried by the frame, have been represented by way of non-limiting illustration. In particular, disks 10 and 12 can define counters in which additional information can advantageously be displayed, whatever its nature, temporal or otherwise (current time, date or other calendar information, power reserve, etc.). The person skilled in the art will be able, for example, to implement a display mode, in relation to the disks 10, 12, such that the orientation of the display concerned is maintained constant in all positions of the disk on the dial. Constructions for achieving such an effect are known in the state of the art. The above-mentioned patent CH710450B1 describes an example in relation to the display of the phases of the Moon, and the person skilled in the art will not encounter any particular difficulty in adapting its teaching and implementing the display of information other than the phases of the Moon.

According to the present invention, the display mechanism 1 is arranged in such a way that the mask 6 and the representation of the Moon 4 move, during each lunar cycle, according to the following sequence:

a) with both the representation of the Moon 4 and the mask 6 located in an initial position, in a new Moon configuration, the representation of the Moon 4 is driven along a predefined trajectory, to progressively disengage from the mask 6, until it is positioned in a final position in the middle of a given lunar cycle, in a full Moon configuration, b) the mask 6 is driven along the same predefined trajectory, to progressively cover the representation of the Moon 4, until it is positioned in the same final position at the end of the given lunar cycle, in a new Moon configuration.

At the end of the sequence, the representation of the Moon 4 and the mask 6 are driven so as to quickly return to the initial position, in a new Moon configuration, thus passing from the configuration of day 29 to that of the first day, to start a new sequence.

It can be seen here that the representation of the Moon 4 has a large diameter in reference to that of the earlier mechanisms cited above, offering excellent legibility. More specifically, it is advantageous to provide that the diameter of the representation of the Moon represents at least 50%, preferably at least 60%, of the radius of the rotating dial carrying it.

The display mechanism 1 according to the present invention thus makes it possible to implement a spectacular display of the phases of the Moon, without having to forego displaying other information. Indeed, the large dimensions of the representation of the Moon 4 and of the mask 6 have an impact on the extent of the trajectory they both describe, which is significant (it extends over a little less than half a dial in the example shown in FIG. 1), but the drive kinematics implemented optimize the corresponding footprint. In addition, the available surface area can be used, as mentioned above, to display additional information, in particular through the use of disks 10, 12. Note that the mask 6 itself can also be used to display information as described above in connection with disks 10 and 12.

This results in a particularly advantageous combination of features, making it possible both to take advantage of a significant portion of the dial surface to display various items of information, and to implement an extremely legible Moon phase display, while remaining faithful to the Moon's appearance as seen in the sky when it is located at its zenith. Even more advantageously, additional features will be described later, whereby the rotating dial carrying the representation of the Moon 4 and the frame 8 carrying the mask 6 can be manually pivoted, simultaneously, to adjust the orientation of the Moon phase display according to the latitude at which the wearer of a timepiece incorporating a display mechanism 1 according to the present preferred embodiment of the invention is located.

Figure 2:
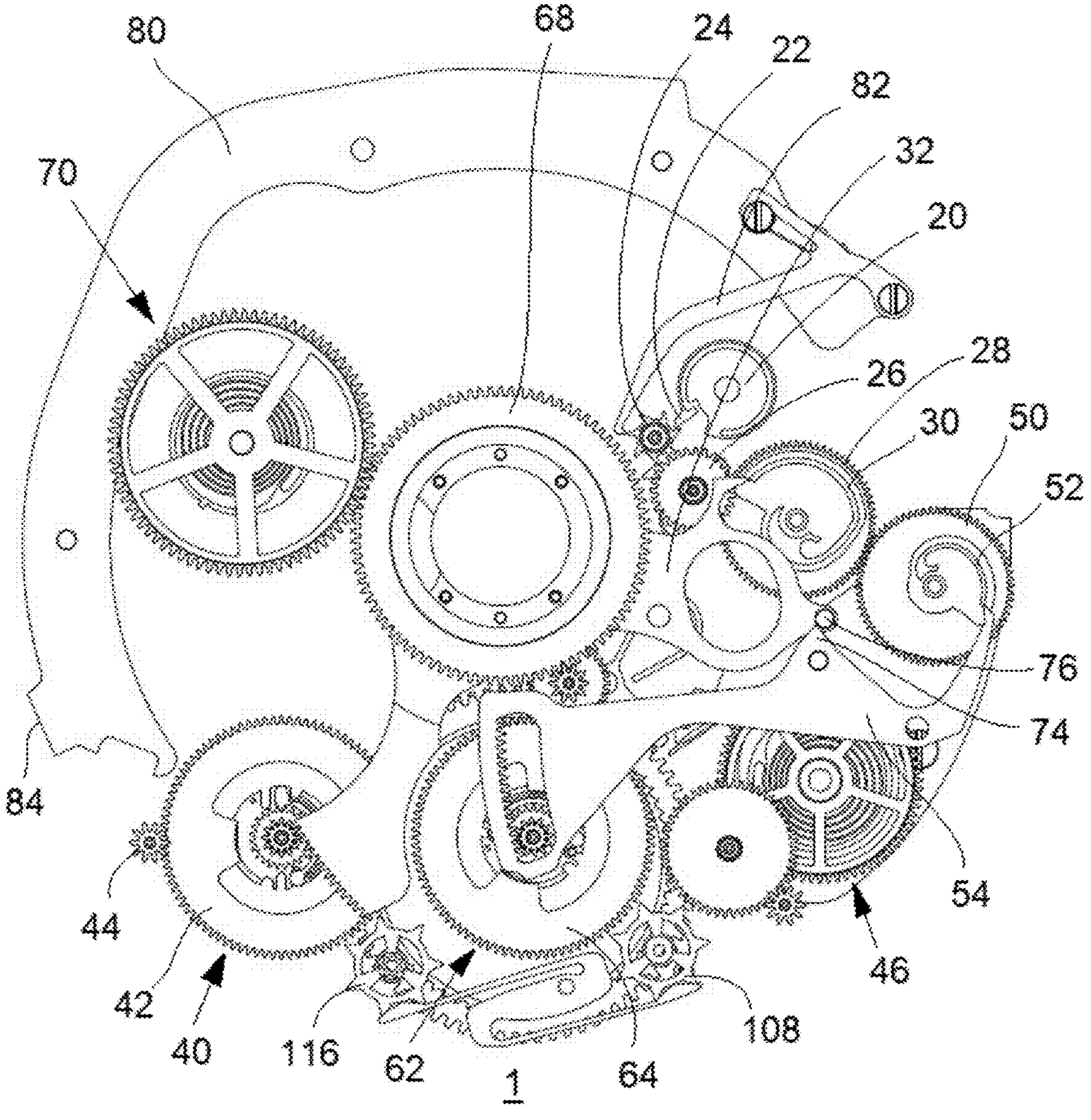
FIG. 2 represents a simplified general front view of a part of the display mechanism according to the preferred embodiment of the invention.

FIG. 2 shows a simplified general front view of part of the display mechanism 1 according to the preferred embodiment of the invention.

The display mechanism 1 can be directly integrated into a watch movement or it can be assembled to a basic watch movement in the form of an additional module without departing from the scope of the invention. A display mechanism 1 in the form of an additional display module will be described below for the sake of simplicity. The construction details of the basic watch movement will not be discussed here, for the sake of conciseness and simplification, since the implementation of the present invention does not directly depend on them.

A twenty-four hour mobile 20 is driven by a mobile (not visible) of the watch movement to make one revolution on itself in twenty-four hours. The twenty-four-hour wheel 20 carries a finger 22 designed to cooperate with a Moon star 24 to rotate it by one step per day when the twenty-four-hour wheel rotates counter-clockwise in the view of FIG. 2. Finger 22 has a special construction which enables it to retract when it encounters the Moon star 24 while the twenty-four-hour mobile 20 is rotating clockwise (in particular in the case of correcting the current time).

The Moon star 24 in turn co-operates with a reducer mobile 26 arranged in engagement with a Moon cam mobile 28 comprising a groove defining a Moon cam 30.

Figure 3:
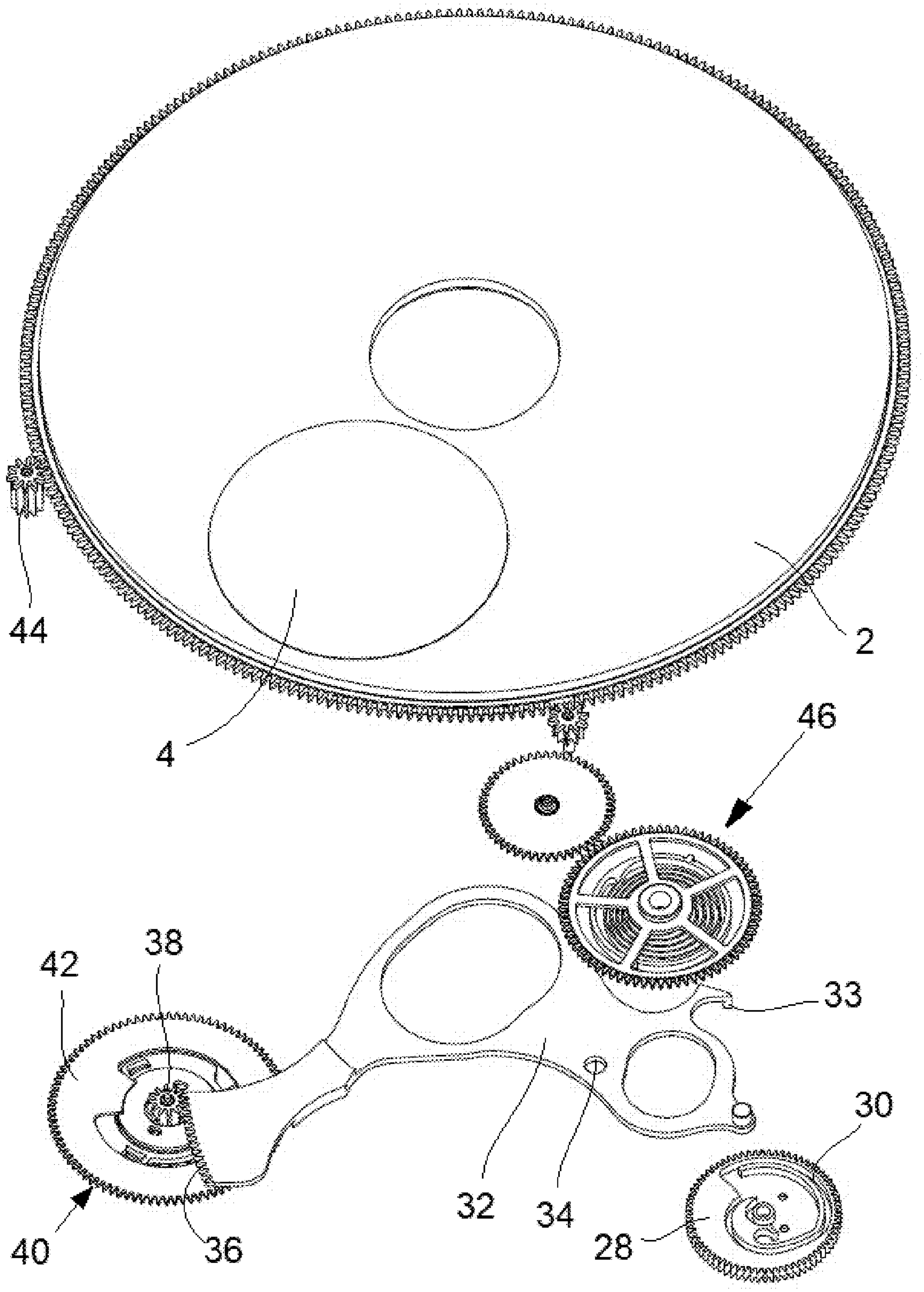
FIG. 3 shows a simplified exploded perspective view of a first construction detail of the display mechanism shown in FIG. 2.

FIG. 3 shows a simplified exploded perspective view of a part of the display mechanism 1, allowing a better understanding of the function of the Moon cam 30, in particular how it drives the Moon display member 2.

The display mechanism 1 comprises a Moon rocker 32 arranged on a frame element (not shown) so as to be able to pivot along an axis of rotation 34. The moon rocker 32 carries a finger 33 which acts as a feeler by engaging in the moon cam 30 and being held in abutment against at least one of its walls, the latter defining a guide surface for the moon rocker 32. The latter also carries a toothed sector 36 arranged in mesh with a pinion 38 of a drive wheel 40 of the Moon display member 2, with which its wheel 42 is in mesh via an intermediate wheel 44 (the meshing being better visible in FIG. 2).

In addition, an elastic return member 46 is kinematically linked to the Moon display member 2 to apply a resilient return force to the latter, tending to hold the feeler against the guide surface of the Moon cam 30.

It is also apparent from FIG. 3 that the Moon cam 30 has a spiral shape with a first portion extending substantially over half its total length and having an increasing radius, followed by a second portion also extending substantially over half its total length and having a constant radius, and then a third, empty or radial, portion enabling the finger 33 to fall back from the second portion onto the first portion at the end of the lunar cycle.

Thus, when the Moon cam mobile 28 is driven from the twenty-four hour mobile 20, in the clockwise direction of rotation as seen in FIG. 3, the Moon cam 30 presents an increasing radius to the feeler from the beginning of the first portion, causing the Moon rocker 32 to rotate counter-clockwise and the Moon display member 2 to rotate clockwise. During this phase, the elastic return member 46 accumulates mechanical energy.

When the feeler reaches the second portion of the Moon cam 30, the latter continues to rotate without rotating the Moon rocker 32 any further. The Moon display member 2 and therefore the representation of the Moon 4 then remain stationary.

When the feeler reaches the third portion of the Moon cam 30, the elastic return member 46 can release the accumulated mechanical energy by causing the feeler to fall to the level of the first portion of the Moon cam 30, rapidly rotating the Moon rocker 32 in the clockwise direction of rotation as seen in FIG. 3, via the Moon display member 2 and its drive wheel 40.

Returning to FIG. 2, it can be seen that the Moon cam mobile 28 is arranged in engagement with a mask cam mobile 50 comprising a groove defining an additional mask cam 52.

Figure 4:
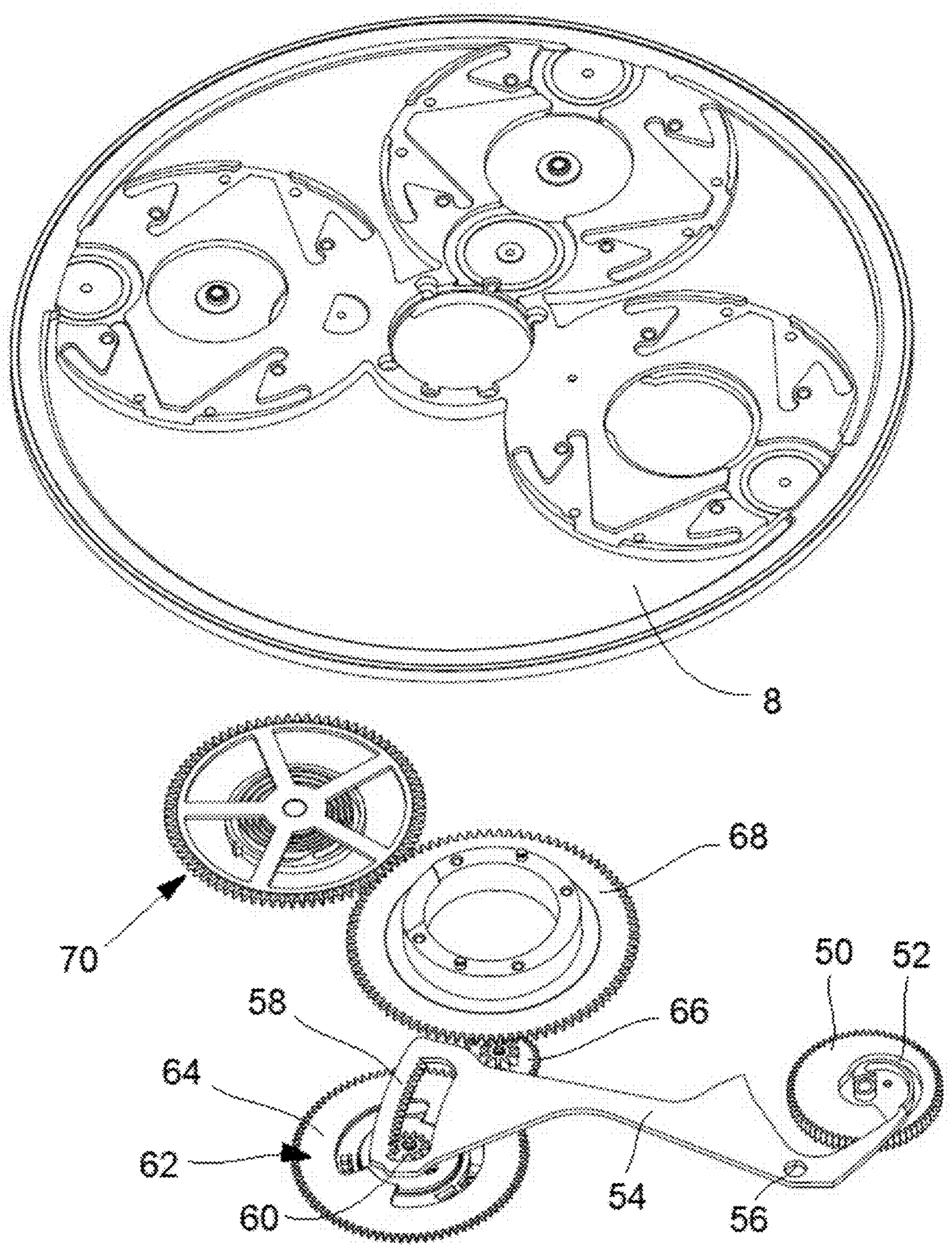
FIG. 4 shows a simplified exploded perspective view of a second construction detail of the display mechanism shown in FIG. 2.

FIG. 4 shows a simplified exploded perspective view of a part of the display mechanism 1, allowing a better understanding of the function of the additional mask cam 52, in particular how it drives the frame 8 carrying the mask 6.

The display mechanism 1 comprises a mask rocker 54 arranged on a frame element (not shown) so as to be pivotable about an axis of rotation 56. The mask rocker 54 carries a finger (not visible) fulfilling the function of an additional feeler by being engaged in the additional mask cam 52 and being held in abutment against at least one of its walls, the latter defining a guide surface for the mask rocker 54. The latter also carries a toothing 58 arranged in engagement with a pinion 60 of a driving mobile 62 of the frame 8, to which its wheel 64 is kinematically connected via a transmission wheel 66 and a crown 68 intended to be directly integral with the frame 8.

In addition, an elastic return member 70 is kinematically connected to the crown 68 to apply an elastic return force to the frame 8, tending to hold the additional feeler against the guide surface of the additional mask cam 52.

It is also apparent from FIG. 4 that the additional mask cam 52 has a spiral shape with a first portion extending substantially over half its total length (at the level of the central shaft) and having a constant radius, followed by a second portion also extending substantially over half its total length and having an increasing radius, and then a third portion, empty or radial, enabling the additional feeler to fall back from the second portion onto the first portion at the end of the lunar cycle.

Thus, when the mask cam mobile 50 is driven from the twenty-four hour mobile 20, via the Moon cam mobile 28, in the counter-clockwise direction of rotation in the view of FIG. 4, the additional mask cam 52 presents a constant radius to the additional feeler since the beginning of the first portion, resulting in the absence of rotation of the mask rocker 54 and therefore of the mask 6 during half of a given lunar cycle.

When the feeler reaches the second portion of the additional mask cam 52, the latter presents an increasing radius to the additional feeler, causing the mask rocker 54 to rotate counter-clockwise in the view of FIG. 4, thus rotating the frame 8 and therefore the mask 6 clockwise. During this phase, the elastic return member 70 accumulates mechanical energy.

When the feeler reaches the third portion of the additional mask cam 52, the elastic return member 70 can release the accumulated mechanical energy by causing the additional feeler to fall back to the level of the first portion of the additional mask cam 52, by rapidly rotating the mask rocker 54 in the counter-clockwise direction of rotation in the view of FIG. 4, via the crown 68 and the transmission wheel 66.

As already mentioned above, the mask 6 and the discs 10 and 12 can be used for additional displays of any type of information, temporal or otherwise. Various holes and recesses have been shown in these three discs, by way of non-limiting illustration (in particular to allow the mounting of mobiles, springs and the passage of sets of hands).

Referring again to FIG. 2, it can be seen that the mask rocker 54 comprises a beak defining a stop surface 74 arranged to be able to cooperate with a bearing surface 76 of the Moon rocker 32, defined here by a pin. The cooperation between these stop and bearing surfaces ensures good synchronization during the retrograde return of the two rockers 32 and 54. In fact, it can be seen that, in the configuration of the display mechanism 1 illustrated in FIG. 2, when the feelers are close to the end of the second portion of the corresponding cam, if the Moon rocker 32 were to be released before the mask rocker 54, for example in the event of an impact, it would not be able to fall into the third portion of the corresponding cam due to the contact between its bearing surface 76 and the stop surface 74 of the mask rocker 54.

Advantageously, the display mechanism 1 includes a Moon phase display correction member, here comprising a correction rocker 80 carrying a retractable pawl 82, arranged to act directly on the Moon star 24. The correction rocker 80 has an actuating surface 84 designed to receive pulses in response to suitable actions by a user, after which the correction rocker 80 pivots to advance the Moon star 24 by at least one step per actuation.

Advantageously, the display mechanism 1 according to the present preferred embodiment of the invention further comprises a latitude adjustment device arranged to modify the angular orientations of the Moon display member 2 and the mask 6, in a coordinated manner, in response to a predefined action of a user on a latitude adjustment member.

Figure 5:
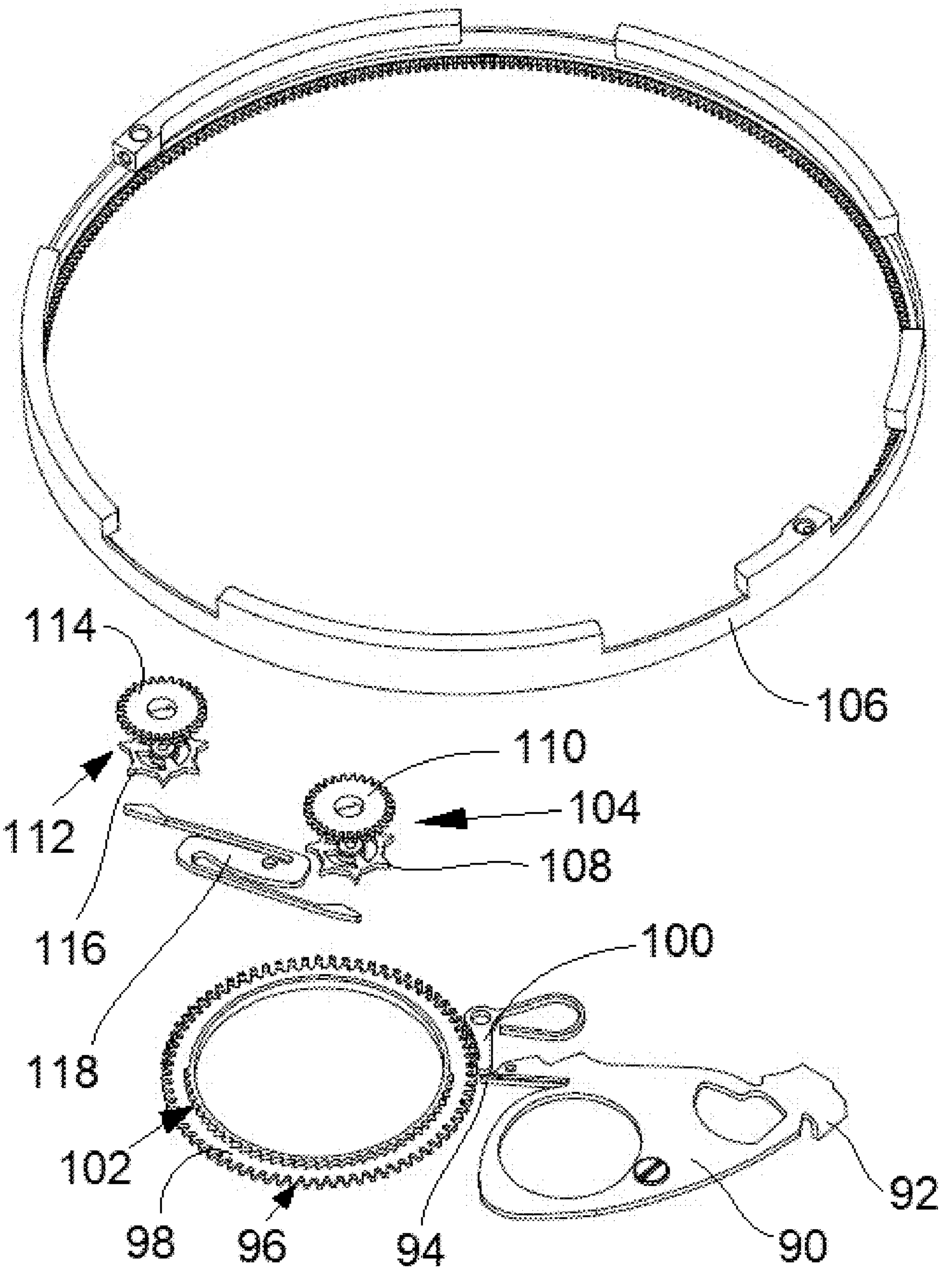
FIG. 5 shows a simplified exploded perspective view of a third construction detail of the display mechanism shown in FIG. 2.

This adjustment device can be seen more clearly in FIG. 5, which shows its main components in a simplified exploded perspective view.

The latitude adjustment device comprises a correction rocker 90 having an actuating surface 92 intended to receive impulses from a user via a corrector (not visible), for example, to pivot on a frame member.

The correction rocker 90 carries an actuation beak 94 arranged to act on the main toothing 96 of a latitude correction wheel 98 and advance the latter by at least one step per impulse applied by the user. A conventional jumper 100 is used to hold the latitude correction wheel 98 in a given position, by also cooperating with its main toothing 96.

Half of the teeth of the main toothing 96 include extensions oriented in a direction substantially parallel to the direction of the rotation axis of the latitude correction wheel 98, while the latter comprises an internal secondary toothing 102.

The two toothings 96 and 102 are arranged to cooperate with a drive wheel 104 of a latitude indicator (not shown), via a toothed ring 106 with which the latter is intended to be integral. The latitude indicator can carry an indication designed to cooperate with a fixed latitude graduation scale, or it can carry a latitude graduation scale designed to cooperate with a fixed indication to display the value of the set latitude.

The driving of the drive wheel 104 is realized via a lower star (hidden in FIG. 5), while the drive wheel comprises a main star 108 arranged in engagement with the wheel 64 of the drive wheel 62 of the frame 8, as shown in FIG. 2.

The drive wheel 104 also comprises a pinion 110, by means of which it drives the toothed ring 106.

The toothed ring 106 in turn drives a Moon drive wheel 112 via a pinion 114 of the latter. The Moon drive wheel 112 also comprises a star 116 arranged in mesh with the wheel 42 of the drive wheel 40 of the Moon display member 2. Each of the drive wheels 40, 62 advantageously includes a friction between its wheel and pinion, to allow rotation of the wheel only, during latitude adjustment.

Thus, when the user applies impulses to the correction rocker 90, he simultaneously rotates the Moon display member 2 and the frame 8 carrying the mask 6, in the same direction of rotation, without modifying the positions of the representation of the Moon 4 and the mask 6 along their trajectory.

After a certain number of impulses, the toothing of the latitude correction wheel 98, which is in engagement with the lower star of the drive wheel 104, changes, resulting in a change in the direction of rotation of the latter. Such a design allows, with appropriate indexing of the mechanism, to correct the latitude over its entire range of values without changing the way in which the corresponding control element, in this case a corrector, is manipulated. For example, starting from an initial latitude setting of 45 degrees, the first impulses will increase its value until it reaches 90 degrees. The next impulse will then decrease the latitude value, allowing the user to decrease it to −90 degrees before increasing it again by continuing to apply impulses to the corrector.

A double jumper 118 is arranged to cooperate with the drive wheels 104 and 112 to ensure their orientation in the set position. It is of course possible to provide two independent jumpers as an alternative.

Thanks to the features described above, it is possible to create a Moon phase display mechanism that is original in appearance and faithful to a real observation of the Moon in the sky, while offering excellent legibility without blocking the addition of further complications to the dial of the corresponding timepiece.

The foregoing description is intended to describe a particular embodiment by way of non-limiting illustration, and the invention is not limited to the implementation of certain particular features just described, such as, for example, the implementation of the additional discs carried by the frame, or even their number when there are any, or their shape (which is not limited to a disc). Furthermore, the display mechanism just described can be implemented without the latitude adjustment mechanism, without departing from the scope of the present invention as defined by the claims. In this case, the mechanism could, for example, be customized for each purchaser, with a latitude setting corresponding to his or her place of residence. When a latitude setting mechanism is implemented, it may also be envisaged that it is actuated by rotation of an external control crown, in either direction, as an alternative to what has been described above.

The invention claimed is:

1. A Moon phase display mechanism, for a watch movement, comprising:

a representation of the Moon having the shape of a disc, a mask suitable for masking said representation of the Moon, a drive device for said mask arranged to drive said mask along a predefined trajectory extending from an initial position to a final position, so that said representation of the Moon and said mask can present, along said trajectory, a full Moon configuration in which said representation of the Moon is completely visible, and a new Moon configuration in which said representation of the Moon is completely masked, —a Moon display member carrying said representation of the Moon, as well as a drive device for said Moon display member arranged to drive said Moon display member along said predefined trajectory, between said initial and final positions, wherein the Moon phase display mechanism is arranged in such a way that said mask and said representation of the Moon are driven, during each lunar cycle, according to the following sequence:

a) with said representation of the Moon and said mask being both located in said initial position, in a new Moon configuration, said representation of the Moon is driven along said predefined trajectory, to progressively disengage from said mask, until being positioned in said final position in the middle of a given lunar cycle, in a full Moon configuration, b) said mask is driven along said predefined trajectory, to progressively cover said representation of the Moon, until said mask is positioned in said final position at the end of the given lunar cycle, in a new Moon configuration, and c) said representation of the Moon and said mask are driven so as to both rapidly return to said initial position, in a new Moon configuration, to begin a new sequence.

2. The Moon phase display mechanism of claim 1, further arranged to drive said representation of the Moon and said mask in a retrograde manner in step c), with reference to their direction of movement in steps a) and b).

3. The Moon phase display mechanism of claim 2, wherein said representation of the Moon and said mask are driven substantially simultaneously in step c).

4. The Moon phase display mechanism of claim 2, wherein said device for driving said Moon display member comprises a feeler held in abutment against a guide surface of a cam, to define the angular orientation of said feeler at each instant, under the effect of the action of an elastic return member, and wherein said feeler is integral with a toothing arranged in engagement with a Moon drive wheel whose angular orientation determines the angular orientation of said Moon display member.

5. The Moon phase display mechanism of claim 4, wherein said guide surface has a first portion of increasing radius, followed by a second portion of substantially constant radius and a third portion, empty or radial, connecting the first and second portions.

6. The Moon phase display mechanism of claim 5, wherein said device for driving said mask comprises an additional feeler held in abutment against a guide surface of an additional cam, to define the angular orientation of said additional feeler at each instant, under the effect of the action of an elastic return member, and wherein said additional feeler is integral with a toothing arranged in engagement with a driving mobile of said mask, the angular orientation of which determines the angular orientation of said mask.

7. The Moon phase display mechanism of claim 6, wherein said guide surface of said additional cam has a first portion of substantially constant radius, followed by a second portion of increasing radius and a third portion, empty or radial, connecting the first and second portions.

8. The Moon phase display mechanism of claim 7, further comprising a kinematic connection between said cam and said additional cam, wherein the first and second portions of the guide surface of said cam and the first and second portions of the guide surface of said additional cam all have substantially equal angular extents.

9. The Moon phase display mechanism of claim 8, further comprising a bearing surface integral with one of said feeler and said additional feeler and capable of bearing against a stop surface integral with the other feeler, wherein said feeler and said additional feeler are arranged in such a way that the passage of the feeler associated with said bearing surface from the second portion to the first portion of said corresponding guide surface is conditioned by the passage of said feeler associated with said bearing surface from the second portion to the first portion of said corresponding guide surface, in order to synchronize the movements of said Moon display member and said mask in step c).

10. The Moon phase display mechanism of claim 9, further comprising a latitude adjustment device arranged to modify the angular orientations of said Moon display member and said mask, in a coordinated manner, in response to a predefined action of a user on a latitude adjustment member.

11. The Moon phase display mechanism of claim 10, further comprising a latitude display member to display the set latitude at each instant, said latitude adjustment device also being arranged to control the position of said latitude display member.

12. The Moon phase display mechanism of claim 10, wherein said Moon display member is a rotary dial, and wherein said mask is carried by a frame further carrying a surface for displaying information other than Moon phases and arranged so as to mask a portion of said rotary dial other than said representation of the Moon.

13. The Moon phase display mechanism of claim 12, wherein said representation of the Moon has a diameter representing at least 50% of the radius of said rotary dial.

14. The Moon phase display mechanism of claim 8, further comprising a latitude adjustment device arranged to modify the angular orientations of said Moon display member and said mask, in a coordinated manner, in response to a predefined action of a user on a latitude adjustment member.

15. The Moon phase display mechanism of claim 14, further comprising a latitude display member to display the set latitude at each instant, said latitude adjustment device also being arranged to control the position of said latitude display member.

16. The Moon phase display mechanism of claim 14, wherein said Moon display member is a rotary dial, and wherein said mask is carried by a frame further carrying a surface for displaying information other than Moon phases and arranged so as to mask a portion of said rotary dial other than said representation of the Moon.

17. The Moon phase display mechanism of claim 8, wherein said Moon display member is a rotary dial, and wherein said mask is carried by a frame further carrying a surface for displaying information other than Moon phases and arranged so as to mask a portion of said rotary dial other than said representation of the Moon.

18. The Moon phase display mechanism of claim 7, wherein said Moon display member is a rotary dial, and wherein said mask is carried by a frame further carrying a surface for displaying information other than Moon phases and arranged so as to mask a portion of said rotary dial other than said representation of the Moon.

19. The Moon phase display mechanism of claim 18, wherein said representation of the Moon has a diameter representing at least 50% of the radius of said rotary dial.

20. The Moon phase display mechanism of claim 1, wherein said Moon display member is a rotary dial, and wherein said mask is carried by a frame further carrying a surface for displaying information other than Moon phases and arranged so as to mask a portion of said rotary dial other than said representation of the Moon.

21. The Moon phase display mechanism of claim 20, wherein said representation of the Moon has a diameter representing at least 50% of the radius of said rotary dial.

22. A watch movement comprising a Moon phase display mechanism comprising: —a representation of the Moon having the shape of a disc, —a mask suitable for masking said representation of the Moon, —a drive device for said mask arranged to drive said mask along a predefined trajectory extending from an initial position to a final position, so that said representation of the Moon and said mask can present, along said trajectory, a full Moon configuration in which said representation of the Moon is completely visible, and a new Moon configuration in which said representation of the Moon is completely masked, —a Moon display member carrying said representation of the Moon, as well as a drive device for said Moon display member arranged to drive said Moon display member along said predefined trajectory, between said initial and final positions, wherein the Moon phase display mechanism is arranged in such a way that said mask and said representation of the Moon are driven, during each lunar cycle, according to the following sequence:

a) with said representation of the Moon and said mask being both located in said initial position, in a new Moon configuration, said representation of the Moon is driven along said predefined trajectory, to progressively disengage from said mask, until being positioned in said final position in the middle of a given lunar cycle, in a full Moon configuration, b) said mask is driven along said predefined trajectory, to progressively cover said representation of the Moon, until said mask is positioned in said final position at the end of the given lunar cycle, in a new Moon configuration, and c) said representation of the Moon and said mask are driven so as to both rapidly return to said initial position, in a new Moon configuration, to begin a new sequence.

23. The watch movement of claim 22, wherein said Moon phase display mechanism is further arranged to drive said representation of the Moon and said mask in a retrograde manner in step c), with reference to their direction of movement in steps a) and b).

24. The watch movement of claim 23, wherein said device for driving said Moon display member comprises a feeler held in abutment against a guide surface of a cam, to define the angular orientation of said feeler at each instant, under the effect of the action of an elastic return member, and wherein said feeler is integral with a toothing arranged in engagement with a Moon drive wheel whose angular orientation determines the angular orientation of said Moon display member.

25. The watch movement of claim 24, wherein said guide surface has a first portion of increasing radius, followed by a second portion of substantially constant radius and a third portion, empty or radial, connecting the first and second portions.

26. The watch movement of claim 25, wherein said device for driving said mask comprises an additional feeler held in abutment against a guide surface of an additional cam, to define the angular orientation of said additional feeler at each instant, under the effect of the action of an elastic return member, and wherein said additional feeler is integral with a toothing arranged in engagement with a driving mobile of said mask, the angular orientation of which determines the angular orientation of said mask.

27. The watch movement of claim 26, wherein said guide surface of said additional cam has a first portion of substantially constant radius, followed by a second portion of increasing radius and a third portion, empty or radial, connecting the first and second portions.

28. The watch movement of claim 27, further comprising a kinematic connection between said cam and said additional cam, wherein the first and second portions of the guide surface of said cam and the first and second portions of the guide surface of said additional cam all have substantially equal angular extents.

29. The watch movement of claim 22, wherein said Moon display member is a rotary dial, and wherein said mask is carried by a frame further carrying a surface for displaying information other than Moon phases and arranged so as to mask a portion of said rotary dial other than said representation of the Moon.

30. A timepiece comprising a watch movement including a Moon phase display mechanism comprising:

a representation of the Moon having the shape of a disc, a mask suitable for masking said representation of the Moon, a drive device for said mask arranged to drive said mask along a predefined trajectory extending from an initial position to a final position, so that said representation of the Moon and said mask can present, along said trajectory, a full Moon configuration in which said representation of the Moon is completely visible, and a new Moon configuration in which said representation of the Moon is completely masked, —a Moon display member carrying said representation of the Moon, as well as a drive device for said Moon display member arranged to drive said Moon display member along said predefined trajectory, between said initial and final positions, wherein the Moon phase display mechanism is arranged in such a way that said mask and said representation of the Moon are driven, during each lunar cycle, according to the following sequence:

a) with said representation of the Moon and said mask being both located in said initial position, in a new Moon configuration, said representation of the Moon is driven along said predefined trajectory, to progressively disengage from said mask, until being positioned in said final position in the middle of a given lunar cycle, in a full Moon configuration, b) said mask is driven along said predefined trajectory, to progressively cover said representation of the Moon, until said mask is positioned in said final position at the end of the given lunar cycle, in a new Moon configuration, and c) said representation of the Moon and said mask are driven so as to both rapidly return to said initial position, in a new Moon configuration, to begin a new sequence.

31. The timepiece of claim 30, wherein said Moon phase display mechanism is further arranged to drive said representation of the Moon and said mask in a retrograde manner in step c), with reference to their direction of movement in steps a) and b).

32. The timepiece of claim 30, wherein said Moon display member is a rotary dial, and wherein said mask is carried by a frame further carrying a surface for displaying information other than Moon phases and arranged so as to mask a portion of said rotary dial other than said representation of the Moon.

* * * * *